J. FORREST.
RAILROAD GATE.
No. 33,035. Patented Aug. 13, 1861.
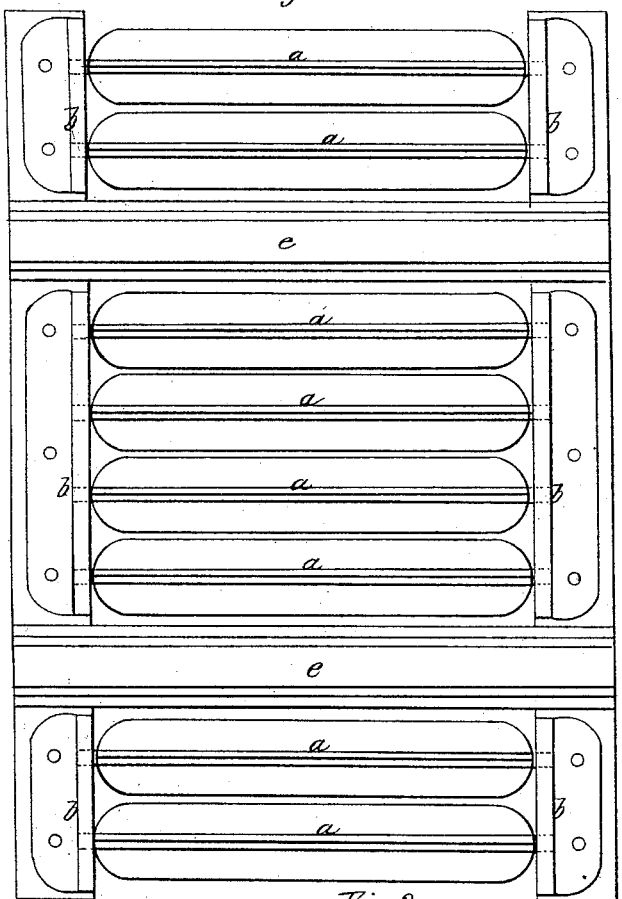

U. S. PATENT OFFICE.

No. 2,031.   1861.   Whole No. 33,035.

Guard for Railways.

JAMES FORREST, OF MANCHESTER, NEW YORK.

Letters Patent No. 2,031, dated August 13, 1861.

SPECIFICATION.

TO ALL WHOM IT MAY CONCERN:

It is hereby made known, that I, JAMES FORREST, of the village of Manchester, in the State of New York, have invented a new Self-acting Cattle Guard for Railroads or other Crossings; and I do hereby declare that the following is a full and exact description thereof, reference being had to the accompanying drawings and to the letters of reference marked thereon.

Figure 1 represents the ground plan.

Fig. 2, the side elevation.

Fig. 3, the end elevation.

The same letters indicate corresponding parts in the different figures. $c$ shows the ground sills; $d$ the cross sills framed into them. Cast iron angle bars $b$ are spiked to the sills and perforated with holes to receive the journals of the four-winged cast iron bars $a$, which turn freely on their axis. $e$ represents the rail or track, and the whole structure may be built upon one or more tier of timbers, as desired. The shafts are placed sufficiently close to prevent the feet of cattle from falling through, at the same time to allow them to freely withdraw them.

The operation may be described as follows: When the cattle or other animals tread upon the wings, the shafts mutually revolve, bringing the edges of the next wings to pinch against their legs so severely as to cause the intruder to immediately back out from the trap, which punishes him for trespassing on the guard, and prevents him getting all his feet thereon.

*Forrest's Improved Guard for Railways.*

What I claim as my invention, and desire to secure by Letters Patent, is—

The revolving self-acting winged shafts, placed in suitable bearings conjointly with the general structure, operating as and for the purposes herein set forth and described.

JAMES FORREST.

Witnesses:
 FRANCIS G. WILLSON,
 RODNEY DURKEE.